US012800732B2

(12) United States Patent
Kuijk et al.

(10) Patent No.: US 12,800,732 B2
(45) Date of Patent: Nov. 17, 2026

(54) TIME-OF-FLIGHT CIRCUITRY AND TIME-OF-FLIGHT METHOD

(71) Applicant: Sony Semiconductor Solutions Corporation, Kanagawa (JP)

(72) Inventors: Maarten Kuijk, Stuttgart (DE); Daniel Van Nieuwenhove, Stuttgart (DE); Morin Dehan, Stuttgart (DE)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1040 days.

(21) Appl. No.: 17/765,838

(22) PCT Filed: Oct. 6, 2020

(86) PCT No.: PCT/EP2020/077931

§ 371 (c)(1),
(2) Date: Apr. 1, 2022

(87) PCT Pub. No.: WO2021/069407

PCT Pub. Date: Apr. 15, 2021

(65) Prior Publication Data

US 2022/0404477 A1 Dec. 22, 2022

(30) Foreign Application Priority Data

Oct. 8, 2019 (EP) .................................... 19201908

(51) Int. Cl.
*G01S 7/48* (2006.01)
*G01S 7/4865* (2020.01)
(Continued)

(52) U.S. Cl.
CPC .......... *G01S 7/4876* (2013.01); *G01S 7/4865* (2013.01); *G01S 17/10* (2013.01); *G01S 17/894* (2020.01)

(58) Field of Classification Search
USPC ........................................................ 356/5.01
See application file for complete search history.

(56) References Cited

U.S. PATENT DOCUMENTS 5,818,582 A 10/1998 Fernandez
7,800,739 B2 * 9/2010 Rohner ................ G01S 17/894
356/5.03

(Continued)

FOREIGN PATENT DOCUMENTS

CN 102914375 A 2/2013
CN 106353768 A 1/2017

(Continued)

OTHER PUBLICATIONS

International Search Report and Written Opinion mailed on Nov. 26, 2020, received for PCT Application PCT/EP2020/077931, Filed on Oct. 6, 2020, 9 pages including English Translation.

(Continued)

*Primary Examiner* — James R Hulka
(74) *Attorney, Agent, or Firm* — XSENSUS, LLP

(57) ABSTRACT

The present disclosure generally pertains to time-of-flight circuitry configured to: apply a set of detection time intervals to at least one light detection event for determining a point of time of the at least one light detection event, wherein the set of detection time intervals has a predetermined detection pattern encoding predetermined points of time.

18 Claims, 8 Drawing Sheets

(51) Int. Cl.
*G01S 7/487* (2006.01)
*G01S 17/10* (2020.01)
*G01S 17/894* (2020.01)

(56) References Cited

U.S. PATENT DOCUMENTS

| | | | | |
|---|---|---|---|---|
| 8,497,463 | B2 * | 7/2013 | Widzgowski | H04N 25/773 250/214 R |
| 9,325,920 | B2 * | 4/2016 | Van Nieuwenhove | G01S 17/894 |
| 9,599,712 | B2 * | 3/2017 | Van Der Tempel | G05D 13/08 |
| 9,874,638 | B2 * | 1/2018 | Dorrington | G01S 7/493 |
| 10,061,029 | B2 * | 8/2018 | Waligorski | G01S 7/4914 |
| 10,345,434 | B2 * | 7/2019 | Hinderling | G01S 7/4865 |
| 10,416,293 | B2 * | 9/2019 | Buckley | G01S 17/10 |
| 10,739,447 | B2 * | 8/2020 | Gutierrez Barragan | H04N 23/60 |
| 10,761,197 | B2 * | 9/2020 | Glover | G01S 7/4865 |
| 10,877,133 | B2 * | 12/2020 | Kienzler | G01S 7/4873 |
| 11,105,925 | B2 * | 8/2021 | Pacala | H10F 39/18 |
| 2009/0185159 | A1 | 7/2009 | Rohner et al. | |
| 2012/0280131 | A1 | 11/2012 | Spartiotis | |
| 2013/0032699 | A1 * | 2/2013 | Widzgowski | H04N 25/773 250/214 SW |
| 2013/0089888 | A1 * | 4/2013 | Woodward | G01N 21/41 356/128 |
| 2014/0160461 | A1 | 6/2014 | Van Der Tempel et al. | |
| 2014/0313376 | A1 | 10/2014 | Van Nieuwenhove et al. | |
| 2015/0253429 | A1 | 9/2015 | Dorrington | |
| 2016/0198147 | A1 | 7/2016 | Waligorski et al. | |
| 2017/0016981 | A1 * | 1/2017 | Hinderling | G01S 7/487 |
| 2018/0081041 | A1 * | 3/2018 | Niclass | G01S 17/894 |
| 2018/0164415 | A1 * | 6/2018 | Buckley | G01S 17/18 |
| 2018/0252800 | A1 | 9/2018 | Morcom | |
| 2018/0341010 | A1 * | 11/2018 | Glover | G01S 17/36 |
| 2018/0372851 | A1 | 12/2018 | Kienzler | |
| 2019/0056497 | A1 | 2/2019 | Pacala et al. | |
| 2019/0146073 | A1 | 5/2019 | Gutierrez et al. | |
| 2020/0137373 | A1 * | 4/2020 | Iguchi | G01S 17/894 |
| 2020/0400547 | A1 * | 12/2020 | Yamamoto | G01N 15/14 |

FOREIGN PATENT DOCUMENTS

| | | | |
|---|---|---|---|
| CN | 106657829 | A | 5/2017 |
| CN | 109254471 | A | 1/2019 |
| CN | 109791202 | A | 5/2019 |
| CN | 110073244 | A | 7/2019 |
| EP | 3171199 | A1 | 5/2017 |
| EP | 3382421 | A1 | 10/2018 |

OTHER PUBLICATIONS

Gupta et al., "What Are Optimal Coding Functions for Time-of-Flight Imaging?", Available Online at: http://www1.cs.columbia.edu/CAVE/publications/pdfs/Gupta_TR17.pdf, Jun. 2017, 24 pages.

Qin Peng et al., "Long range absolute distance measurement based on femtosecond laser balanced optical cross-correlation", Acta Phys. Sin., 2012, pp. 240601-1-240601-6, vol. 61, No. 24.

Yue Heng, "Research of Fully Integrated and High Density Single Photon Avalanche Diode Array Detector", Mar. 2015.

* cited by examiner

TIME-OF-FLIGHT CIRCUITRY AND TIME-OF-FLIGHT METHOD

CROSS-REFERENCE TO RELATED APPLICATIONS

The present application is based on PCT filing PCT/EP2020/077931, filed Oct. 6, 2020, and claims priority to EP Application Serial No. 19201908.1, filed Oct. 8, 2019, the entire contents of each are incorporated herein by reference.

TECHNICAL FIELD

The present disclosure generally pertains to time-of-flight circuitry and a time-of-flight method

TECHNICAL BACKGROUND

Generally, time-of-flight (ToF) systems for measuring a distance to a scene are known. It may be distinguished between direct ToF (dToF) and indirect ToF (iToF). In the case of dToF, a roundtrip delay of emitted light is measured and the distance is concluded "directly" based on the roundtrip delay. Generally, dToF sensors may be based, for example, on SPAD (single photon avalanche diode) technology.

In the case of iToF, which may generally be based, e.g., on CAPD (current assisted photonic demodulator) technology, a phase shift of emitted light is determined by a sampling of a transistor gate (or multiple transistor gates) included in or coupled to a CAPD.

In the case of iToF, a light pulse, e.g. a square light pulse of a predetermined frequency, may be emitted by a light source, which is reflected from a scene (e.g. an object) and received by the CAPD.

The CAPD is typically configured to mix a generated signal (e.g. a photo current) with a demodulation frequency, which may roughly have the same frequency as the light pulse, with different phase delays, e.g. 0°, 90°, 180°, and 270°, whereby a ToF phase delay can be estimated, for example by using an ARCTAN function.

Such a measurement may be repeated a second (or a third time or a fourth time, and so on) time with a second demodulation frequency for decreasing a measurement uncertainty and for concluding an unambiguous range (i.e. a distance).

Each measurement may be referred to as a micro-frame and a micro-frame measurement may be repeated several times (e.g. eight times), wherein each measurement may be combined to determine a distance, wherein certain parameters are assumed to be constant, for example a reflectance of the scene, the distance to the scene, and a background illumination (i.e. ambient light).

Although there exist techniques for providing time-of-flight measurements, it is generally desirable to provide time-of-flight circuitry and a time-of-flight method.

SUMMARY

According to a first aspect the disclosure provides time-of-flight circuitry configured to: apply a set of detection time intervals to at least one light detection event for determining a point of time of the at least one light detection event, wherein the set of detection time intervals has a predetermined detection pattern encoding predetermined points of time.

According to a second aspect the disclosure provides a time-of-flight method comprising: applying a set of detection time intervals to at least one light detection event for determining a point of time of the at least one light detection event, wherein the set of detection time intervals has a predetermined detection pattern encoding predetermined points of time.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
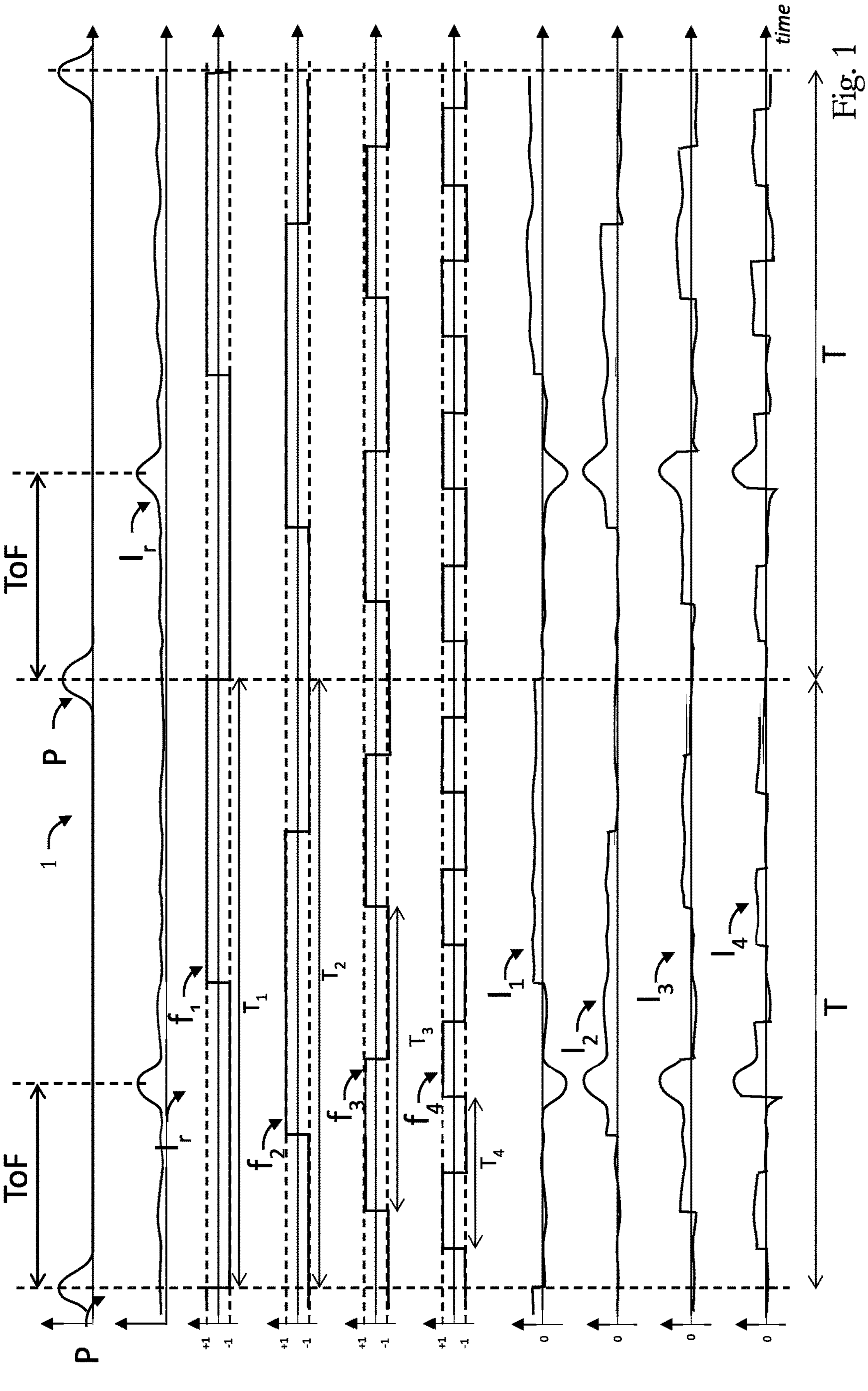
FIG. 1 depicts a timing diagram according to the present disclosure.

Before a detailed description of the embodiments under reference of FIG. 1 is given, general explanations are made.

As mentioned in the outset, in the case of dToF which may be based on SPAD technology, a detection histogram is usually generated, which associates detection times (i.e. times of flight) with the number of counts of the respective detection time.

However, it has been recognized that this may use a certain amount of memory and it is generally desirable to reduce the amount of memory used in a time-of-flight system, for example for increasing the amount of measurements to be performed, to decrease a system size, and the like.

iToF, on the other hand, may be based on CAPD technology and iToF measurements may be noisy and/or associated with a low level of confidence, such that a measurement may be deteriorated.

It is, however, desirable to increase a signal-to-noise ratio and to increase the confidence for improving a distance determination.

It is, moreover, desirable to compensate for shot noise from background light (i.e. ambient light), non-linearities in a distance determination, multipath propagation of emitted light, and loss of precision and accuracy.

For example, as it is generally known, a heating of a light source (e.g. a laser) may influence a light output power, which may have consequences for a measurement accuracy, although a light level (output power) may be assumed constant.

Moreover, for example a concave corner of a room or of an object and so-called flying pixels at object edges may lead to a mixed signal blurring, thereby deteriorating the accuracy.

Since a ToF measurement principle may be based on analog measurement data, non-linearities may also reduce the accuracy and, furthermore, analog measurements require a high number of effective bits for ADC (analog to digital conversion) in each column (or row) of an image sensor.

Additionally, a light detection signal (e.g. a photo current) may be modulated with a duty cycle of fifty percent, thereby requiring a light source to provide a corresponding light emission scheme, since typically applying a current or voltage pulse of a duty cycle of fifty percent to e.g. a laser, may result in a shorter duty cycle of the laser (e.g. forty percent).

Moreover, known systems require a certain processing capacity in order to evaluate a ToF measurement in real-time, since, in order to provide reliable depth information, a filtering between subsequent measurements and/or between adjacent pixels may be needed to be performed, for example, on integer or floating-point level, which may also result in a high power consumption.

Hence, some embodiments pertain to time-of-flight circuitry configured to: apply a set of detection time intervals to at least one light detection event for determining a point of time of the at least one light detection event, wherein the set of detection time intervals has a predetermined detection pattern encoding predetermined points of time.

The time-of-flight circuitry may be or include a processor, such as a CPU (central processing unit), a GPU (graphic processing unit), several coupled CPUs and/or GPUs, and the like. The circuitry may be or include an FPGA (field programmable gate array) or any other integrated circuit (IC), included in or coupled to a time-of-flight image sensor (e.g. a pixel), and the like. The ToF circuitry may also be part of a ToF camera or system including a ToF sensor and an illumination device (including a light source, etc.).

The time-of-flight image sensor may be based on (one or multiple) CAPDs (current assisted photo diode) (e.g. in the case of iToF), (one or multiple) SPADs (single photon avalanche diode) (e.g. in the case of dToF), and may be based on CCD (charge coupled device) technology, CMOS (complementary metal oxide semiconductor) technology, and the like, without limiting the present disclosure to these specific examples.

The time-of-flight image sensor may be or include a single image sensor (e.g. a single pixel), or a plurality (i.e. at least two) of pixels arranged in an array, as it is generally known.

The time-of-flight circuitry may be configured to apply a set of detection time intervals to at least one detection event.

It may be applied (to (one or multiple parts of) the ToF image sensor) as a control command, a voltage signal, a current signal, a digital signal, an analog signal, and the like.

The set of detection time intervals may include any number of detection time intervals equal to or above one, such that a ToF measurement may be performed time-efficiently (e.g. if the number is one or below or equal to a first predetermined threshold) or resolution-efficiently (e.g. if the number is equal to or above a second predetermined threshold of a number of time intervals).

It should be noted that the first and the second predetermined threshold may also correspond to each other.

The detection time intervals may be (one or more) time intervals, in which a detection is performed. The detection time intervals may be based on a condition, such as a light demodulation frequency, a transfer gate demodulation frequency, on a distance to a scene (e.g. an object), environmental factors, such as ambient light, a light condition, and the like.

For example, a start and an end of a detection time interval may be based on the distance to the scene, such that an expected return of reflected light may be covered, within the detection time interval.

In some embodiments, however, a start and an end of a detection time interval may be based on the distance, such that the expected return may not be covered.

Due to such a timing of the detection time intervals, an encoding of a roundtrip time may be performed, as will be discussed below.

A light detection event may be or based on, as already discussed, a detection of a return of emitted light. The light detection event may be or based on an impact of light on the ToF image sensor, a point of time (or time interval) of a generation of a current in response to the impact of light, a start of a demodulation, a start of a counting, and the like.

A point of time of the at least one light detection event may be determined by detecting a current signal, a voltage signal, a power signal, and the like, generated in response to the at least one light detection event.

The generated signal (current, voltage, power, and the like) may be detected by a sampling and/or a driving of a transistor, a timing of a register circuitry, and the like, in the predetermined detection pattern, which may be predetermined by a configuration, a program, based on a situation (e.g. a light condition, a demodulation frequency, and the like, as discussed above), and the like.

The predetermined detection pattern may include a plurality of detection time intervals, which may be applied consecutively, sequentially, simultaneously, (partly) overlapping, and the like, to the generated signal, such that the generated signal may be detected in a subset of the detection time intervals and not detected in another subset of the detection time intervals.

Moreover, the plurality of detection time intervals may include detection time intervals, which differ in at least one of phase and length, such that the predetermined detection pattern may constitute a unique coding scheme, such that a detection event point of time may be assigned to a subset of the detection time intervals.

The coding scheme, which may be represented by a binary code, hex code, and the like, may encode predetermined points of time, such that a code indicates a combination of the detection time intervals.

For example, in the case of a binary code, each binary digit may indicate, whether the detection event happens within the detection time interval the respective binary digit refers to.

For example, if there are two detection time intervals within an overall detection time of ten microseconds, a first detection time interval may cover the first five microseconds and a second detection time interval may cover the last five microseconds. If the detection event happens within the first five microseconds, the binary code may be a one followed by a zero, since a positive recognition of the detection event may be assigned to a binary one and a negative recognition of the detection event may be assigned to a binary zero, without limiting the present disclosure in that regard.

In some embodiments, the predetermined detection pattern is based on a Gray Code.

The detection time intervals may, thus, be chosen in a way that their successive (or simultaneous, or (partly) overlapping) application is Gray coded.

Moreover, the code, which results (as discussed above) may be a Gray Code, which is generally known.

In some embodiments, the time-of-flight circuitry is further configured to apply the set of detection time intervals to a photon counter in the predetermined detection pattern, the photon counter being coupled to a single photon avalanche diode.

The photon counter may be configured to directly or indirectly determine the number of photons incident on the SPAD, for example by measuring a photo current and/or voltage being generated in the SPAD.

In some embodiments, an event based on a digital outcome is detected within the SPAD.

One or several demodulation functions representing the predetermined detection pattern may be used to compare a number of digital events while a sign of the demodulation function is positive with a number of events while the sign of the demodulation function is negative.

If the number of events while the sign of the demodulation function is positive is larger than the number of events while the sign of the demodulation function is negative, a bit may be encoded as one, whereas when the number of events while the sign of the demodulation function is negative is larger than the number of events while the sign of the demodulation function is positive, an encoded bit may be encoded as zero.

The comparing of the signs, as discussed above, may be executed in parallel or sequentially.

Moreover, the comparing may be realized with two separate photon counters (or event counters), wherein one of the two counters may count the events while the sign is positive, and wherein the other counter may count the events while the sign is negative.

The comparing may be realized with one up/down counter, which counts up, when the sign is positive and counts down when the sign is negative (or vice versa).

The comparing may, moreover, be realized with a thermometric shift register, wherein an edge of the shift register is shifted to a first direction when a positive sign is detected and into an opposite direction when a negative sign is detected.

As discussed herein, a SPAD may be used in the case of dToF, which may include an active light illumination system used to determine a distance between an image sensor (including one or multiple SPADs) and a scene by measuring a roundtrip delay needed by a light pulse to reach the object and to come back to the sensor.

To evaluate the distance to the scene, a dToF system may record histograms of detected photons for a duration (i.e. a detection time), which may be based on the maximum detection range.

The histogram may be discretized in time according to an internal reference clock, for example a time to digital converter (TDC), without limiting the present disclosure in that regard (wherein the TDC itself is may not be needed for the Gray coding as discussed herein).

A plurality of dToF measurements may be performed consecutively (or sequentially) in order to compensate for noise, e.g. due to ambient light or internal system noise, and added to the histogram, such that an accumulated histogram may be generated for all measurements or a subset of all measurements.

However, as discussed above, the accumulated histogram may require a certain amount of memory per pixel.

The histogram may be evaluated according to a coding scheme, such as a Gray Code scheme as discussed herein, and results of the coding may be stored in one or more memory nodes for each Gray Code pattern, which in turn may be evaluated sequentially or in parallel, as will be discussed further below.

For determining the Gray Code values (i.e. the Gray Code bits), a signal may be stored in two unsigned counters, which may be compared and the larger value may establish the Gray Code value.

The Gray Code values may further be determined by using a single memory storage node with a signed integer and values may be added or subtracted depending on the Gray Code.

The Gray Code values may also be determined by a processing of the accumulated histogram by using a bidirectional shift register.

The detection time intervals may be applied to the photon counter, such that the photon counter may count whether a photon is detected within the detection time intervals.

In some embodiments, a plurality of photon counters is applied, which are driven simultaneously, such that the detection time intervals are applied simultaneously, as well, and a coding may efficiently be performed.

In some embodiments, the photon counter is a Gray Code counter, i.e. a timing of the controller and a decision whether a photon is detected or not may be represented by a Gray Code.

In some embodiments, the time-of-flight circuitry is further configured to decode the point of time based on Gray Code information generated in the Gray Code counter indicating a distance to a scene, as discussed above.

In some embodiments, the time-of-flight circuitry is further configured to: demodulate a current assisted photonic demodulator, with a set of demodulation patterns, thereby applying the set of detection time intervals.

Such embodiments may be at hand in the case when a ToF image sensor includes CAPDs.

However, the present disclosure is not limited to the case of CAPDs, as it may be also applicable to photonic demodulators in general.

Generally, in a CAPD charges may be collected by an accumulation in two (or more) detectors, wherein, depending on a sign of a demodulation function, a charge is transferred to a first detector or a second detector.

For example, if the sign of the demodulation function is positive, a charge is transferred to the first detectors, whereas, if the sign is negative, a charge is transferred to the second detector, such that the total charge accumulated in the first detector may be compared to the total charge accumulated in the second detector, such that a one may be encoded, if the total charge in the first detector is larger than in the second detector, and a two may be encoded, if the total charge in the second detector is larger than in the first detector, or vice versa.

Each demodulation pattern may be included in a micro-frame (as discussed above), and a total of n micro-frames may be recorded, wherein a system period of a time T may be repeated m times for each micro-frame.

During each micro-frame, minority carriers (e.g. based on a photo current) may be generated in response to received light, which may be mixed with a demodulation signal $f_i$ from a total of demodulation signals f being different for each micro-frame.

Each demodulation signal $f_i$ may have a period $T_i$ (i.e. a detection time interval) having a certain phase. The periods $T_i$ may be chosen such that they form a Gray Code relationship to each other.

Then, a resulting mixed signal generated by mixing (e.g. multiplying) the photo current signal with each demodulation signal $f_i$ may have a sign (plus or minus) indicating whether it corresponds to a one (plus) or a zero (minus) in a Gray Code, thereby generating a Gray Code bit value of a distance to a scene.

For example for eight demodulation signals, i.e. n is equal to eight, a distance resolution of two-hundred and fifty-six bits may be achieved, resulting in a deviation less than half a percent compared to an unambiguous distance.

A digital mapping may then provide the possibility to convert from the generated Gray Code to a standard digital code, wherein an evaluation of a direct digital outcome of a SPAD may also be envisaged.

Moreover, a mixed signal may have a norm, e.g. a mean value of a peak, which indicates a certainty whether the recorded bit is correct or not.

On the other hand, an analog value with its sign (i.e. the Gray Code bit) may be recorded after each demodulation micro-frame. The norm of the signal may give the confidence level of the ToF measurement, which may indicate a quality of the performed measurement.

In a case, in which one analog value has a norm below a predetermined threshold compared to the other analog values deriving from the same measurement, it may be the case that the distance to the scene is at a boundary between two Gray Codes, such that a further refinement of the depth may be made, which in total may increase the accuracy above the n-bit precision.

Moreover, recording analog values may compensate for offsets caused by voltage followers and current sources caused by a readout.

Furthermore, it may be envisaged to provide a low offset comparator in each pixel (e.g. an optimized sense-amplifier which may be synchronous or asynchronous), such that a Gray Code bit may be immediately generated for each micro-frame.

As it is generally known, there may be a bit error occurring since each measurement may have a certain probability to be wrong.

For example, if the bit error is 10' and ten bits (i.e. n=10) are measured, there may roughly be a chance of one out of thousand to have a wrong bit in a full frame including ten micro-frames, such that applying the time-of-flight circuitry according to the present disclosure may deliver a more precise measurement than known systems.

Moreover, non-linearities may (roughly) have no effect to the coding scheme of the present disclosure.

In the case that the received light pulse is centered around an edge of a demodulation function, a statistic spread of the outcome of that one bit may be used to refine a distance estimate above the n-bit precision, as discussed above.

Since a Gray Code may be utilized, only one Gray Code bit at a time may lay on an edge of a demodulation function.

Moreover, a wrong bit may be singled out by considering consecutive frames, wherein each bit may be checked on its behavior in subsequent frames, and moreover by considering a confidence (as discussed above).

In some embodiments, a sign of an average of the mixed signal may be evaluated, wherein, in some embodiments, the sign may be based on a direct digital outcome of a ToF measurement.

In the case that the scene moves (or the camera moves) (e.g. slower than a predetermined threshold), a temporal filter may be applied, for example, on a (single) bit level, or on the full distance determination (i.e. on all bits).

Moreover, measurement data from an adjacent pixel (or multiple adjacent pixels) may be used for a digital filter, either on bit level or on the full distance determination, or on both.

It should be noted that since it may be possible according to the present disclosure to perform bit level manipulation, bit level filtering may also become possible.

Filtering may be provided directly in a pixel or in a parallel layer, in a case of a stacked image sensor.

By applying a filter as discussed herein, it may lead to a reduction of illumination power.

Moreover, a bit level operation may generally not be as elaborate than an operation on a complex analog signal.

Figure 3:
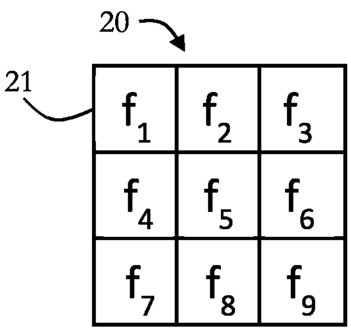
FIG. 3 shows a block diagram of a configuration of an image sensor based on CAPD technology.

In some embodiments, a macro-pixel is provided, whereby an area of the scene may get diffused onto a grid of an image sensor (e.g. a grid of three times three pixels, also discussed with respect to FIG. 3), wherein to each sub-pixel an own demodulation function may be applied.

Thereby, each micro-frame may generate a full distance determination resulting in nine bits resolution.

Thereby, a ToF measurement may be performed time-efficiently with a direct digital distance determination, which may also save processing power.

As it is generally known, for example in the field of iToF, a signal generated in a CAPD may be read out by modulating one or multiple transfer gates of one or multiple transfer transistors included in or coupled to the CAPD.

According to some embodiments of the present disclosure, the demodulation of the transfer gate may be performed with a set of demodulation patterns.

For example, in the case of one transfer gate, at a first time interval, a first demodulation pattern may be applied, e.g. with a first demodulation frequency, and at a second time interval, a second demodulation pattern may be applied, e.g. with a second demodulation frequency, without limiting the present disclosure to a set of two demodulation patterns.

On the other hand, the set of demodulation patterns may be applied to a plurality of transfer gates (roughly) simultaneously.

In some embodiments, the time-of-flight circuitry is further configured to mix at least one demodulation signal including the set of demodulation patterns with a light detection signal being indicative of the at least one detection event, thereby generating a mixed signal, and wherein the mixed signal encodes the predetermined points of time.

The at least one demodulation signal may be an electric signal, e.g. a voltage signal, for driving the at least one transfer gate, as it is generally known.

The light detection signal may be a voltage signal, current a current signal, a power signal, a digital signal, an analog signal, and the like being generated in response to a light detection event. For example, a photo current being generated in response to light incident on the CAPD may be considered as a light detection signal.

The light detection signal and the at least one demodulation signal may be electrically mixed, e.g. added, multiplied, multiplexed, and the like, such that a resulting signal (i.e. the mixed signal) is generated.

By means of the mixed signal, the predetermined points of time may be encoded, as already discussed above.

For example, if the light detection signal lies within a logical high of the demodulation signal, the mixed signal may have a value above a predetermined threshold, such that a one may be encoded, whereas, if the light detection signal lies within a logical low of the demodulation signal, the mixed signal may have a value below (or equal) to the predetermined threshold, such that a zero may be encoded, without limiting the present disclosure in that regard.

By mixing the light detection signal with a plurality of demodulation signals or applying the set of detection time intervals, respectively, a time-resolution of a ToF detection may be influenced (e.g. increased).

In some embodiments, the time-of-flight circuitry is further configured to apply the set of demodulation patterns sequentially to the at least one light detection event.

Assuming that multiple detection events may be detected sequentially and that the shape of the respective light detection signals are roughly the same, an encoding may be performed signal-to-noise-efficiently, since the generated detection current may be detected only once for each measurement, such that a signal-to-noise ratio may be kept above a predetermined threshold.

However, in some embodiments the time-of-flight circuitry is further configured to apply the set of demodulation patterns simultaneously to the at least one light detection event.

Thereby, the light detection signal, e.g. a photo current, may be split up to be detected at multiple transfer gates, i.e. mixed with multiple demodulation signals at the same time, such that an encoding may be performed time-efficiently.

In some embodiments, the time-of-flight circuitry is further configured to control a light source to emit light in a predetermined emission pattern based on the predetermined detection pattern.

The light source may be any light source suitable to emit light patterns, such as a diode laser, an LED (laser), any kind of modulated light source, and the like.

The predetermined emission pattern may be based on the demodulation pattern or vice versa. The emission pattern and the demodulation pattern may be correlated in their frequencies, i.e. for each emission pulse, there may be a corresponding demodulation pulse (i.e. a detection time interval), without limiting the present disclosure in that regard. The emission pattern and the demodulation pattern may further correspond in their phase or may be phase shifted, such that an emission pulse may be detected within a demodulation pulse considering an assumed time of flight of emitted light (which may depend on a detection range, and the like).

The frequency and/or the phase correspondence may, however, be not limited to a one to one correspondence, and it may depend on external factors, e.g. a maximum emission frequency versus a maximum demodulation frequency, a pre-exposure, in which no demodulation may be performed, and the like.

Furthermore, the emission pattern may have different shapes, for example a short light pulse synchronized with the system period T (discussed above), a square pulse, a rectangular pulse, a saw tooth pulse, and the like.

In some embodiments, the light pulse width is twenty five percent of the system period T, without limiting the present disclosure to this specific value and any other light pulse width may be implemented.

For each demodulation function, separate emission patterns may be provided, resulting in a multitude of (maximally) n emission patterns (also discussed with respect to FIG. 2 further below).

On the other hand, in embodiments, in which a short light pulse (i.e. a light peak) is used for each micro-frame, a deterioration due to a multipath operation may be reduced, for example when a reflected light signal deriving from a direct light path has a larger amplitude than (the sum of) reflected signals of indirect light paths.

Moreover, non-linearities and noise may be reduced while at the same time, an average light power may be decreased (e.g. two to eight times), thereby saving power on the illumination side.

Some embodiments pertain to a photo gate system, wherein the set of detection time intervals may be applied by applying a voltage on transparent gates (photo gates), thereby directing photo-generated carriers to a respective detector, adjacent to each of the transparent gates.

Some embodiments pertain to a modulation of a transfer gate of a transfer transistor with the set of demodulation patterns, thereby applying the set of detection time intervals. Some embodiments pertain to a time-of-flight method comprising: applying a set of detection time intervals to at least one light detection event for determining a point of time of the at least one light detection event, wherein the set of detection time intervals has a predetermined detection pattern encoding predetermined points of time, as described herein.

The method may be performed with time-of-flight circuitry, as discussed herein.

In some embodiments, the predetermined detection pattern is based on a Gray Code, as discussed herein. In some embodiments the time-of-flight method, further includes applying the set of detection intervals to a photon counter in the predetermined detection pattern, the photon counter being coupled to a single photon avalanche diode, as discussed herein. In some embodiments, the photon counter is a Gray Code counter, as discussed herein. In some embodiments, the time-of-flight method further includes decoding the point of time based on Gray Code information generated in the Gray Code counter indicating a distance to a scene, as discussed herein. In some embodiments, the time-of-flight method further includes demodulating a current assisted photonic demodulator, with a set of demodulation patterns, thereby applying the set of detection time intervals, as discussed herein. In some embodiments, the time-of-flight method further includes mixing at least one demodulation signal including the set of demodulation patterns with a light detection signal being indicative of the at least one detection event, thereby generating a mixed signal, and wherein the mixed signal encodes the predetermined points of time, as discussed herein. In some embodiments, the time-of-flight method, further includes applying the set of demodulation patterns sequentially to the at least one light detection event, as discussed herein. In some embodiments, the time-of-flight method further includes applying the set of demodulation patterns simultaneously to the at least one light detection event, as discussed herein. In some embodiments, the time-of-flight method further includes controlling a light source to emit light in a predetermined emission pattern based on the predetermined detection pattern.

The methods as described herein are also implemented in some embodiments as a computer program causing a computer and/or a processor to perform the method, when being carried out on the computer and/or processor (which may be part of a ToF camera or system). In some embodiments, also a non-transitory computer-readable recording medium is provided that stores therein a computer program product, which, when executed by a processor, such as the processor described above, causes the methods described herein to be performed.

Returning to FIG. 1, there is depicted a timing diagram 1 according to the present disclosure in the case of an implementation in a CAPD based image sensor, without limiting the timing itself to the CAPD case, since the timing may also be applied in embodiments pertaining to SPADs. However, the timing diagram 1 includes demodulation patterns for modulating a (at least one) transfer gate of a CAPD in the present example.

The timing diagram 1 includes two detection periods T. Each detection period is initiated with a light emission peak P. In response to a detection of a reflection of the light emission peak, a recording current $I_r$ (i.e. a photo current) is generated. The time (interval) between the light emission peak P and the generation of the recording current $I_r$ corresponds to the time of flight (ToF) of the emitted light.

The recording current $I_r$ is detected with four demodulation signals $f_1$, $f_2$, $f_3$, and $f_4$ each including respective detection time intervals $T_1$, $T_2$, $T_3$, and $T_4$, wherein each demodulation signal $f_1$ to $f_4$ differs in one of phase, frequency, and number of detection time intervals, and wherein each demodulation signal lies between a logical low (minus one) and a logical high (plus one).

In this embodiment, $f_1$ and $f_2$ have the same number of detection time intervals (i.e. two), but a different phase (ninety degrees phase shift), whereas $f_3$ has the double frequency than $f_1$ and $f_2$ (and thereby the double number of detection time intervals) and is ninety degrees phase shifted with respect to $f_2$, and $f_4$ has the double frequency than $f_3$ (and thereby the double number of detection time intervals) and is ninety degrees phase shifted with respect to $f_3$.

Thereby, the demodulation signals $f_1$ to $f_4$ are Gray coded.

By multiplying the recording current $I_r$ with each demodulation signal $f_1$ to $f_4$, coding currents $I_1$, $I_2$, $I_3$, and $I_4$ (i.e. mixed signals, as discussed herein) are generated resembling whether the recording current $I_r$ lies within a logical high or a logical low of the respective demodulation function $f_1$ to $f_4$.

The coding current $I_1$ has a negative peak (i.e. a dip), resembling that the recording current $I_r$ lies within a logical low of the demodulation signal $f_1$, whereas the coding currents $I_2$ to $I_4$ each have positive peaks resembling that the recording current $I_r$ lies within a logical high of the demodulation signals $f_2$ to $f_4$.

In this embodiment, a dip is assigned to a logical zero and a (positive) peak is assigned to a logical one, thereby encoding the recording current $I_r$ to a sequence of 0111, thereby indicating a smallest detection time interval, in which the time of flight of the emitted light peak lies within.

Figure 2:
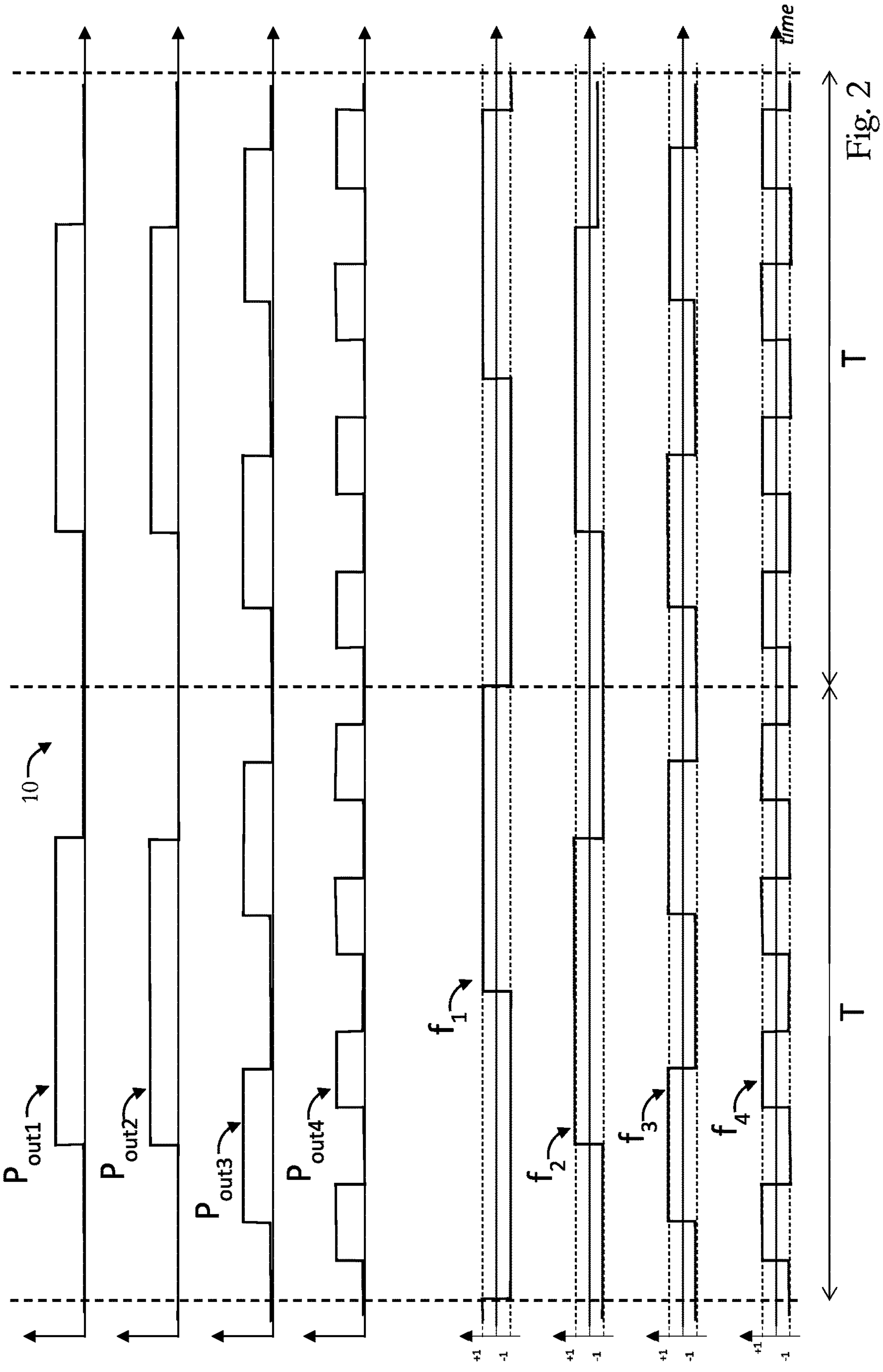
FIG. 2 shows a timing diagram for driving a light source according to the present disclosure.

FIG. 2 shows a timing diagram 10 for driving a light source according to the present disclosure.

The light source is configured to output modulated light and detect it with an associated demodulation signal.

In this embodiment, the light source emits a first modulated light signal $P_{out1}$, which is detected with the first demodulation signal $f_1$. Moreover, a second modulated light signal $P_{out2}$ is emitted, which is detected with the second demodulation signal $f_2$. A third modulated light signal $P_{out3}$ is detected with the third demodulation signal $f_3$ and a fourth modulated light signal $P_{out4}$ is detected with the fourth demodulation signal $f_4$.

The emission and detection of the respective modulated light signals is, in this embodiment, performed sequentially, i.e. emission and detection of $P_{out2}$ is performed after the emission and detection of $P_{out2}$ (and $P_{out4}$ after $P_{out3}$ after $P_{out2}$), without limiting the present disclosure in that regard.

In this embodiment, $P_{out2}$ is the same as $P_{out1}$, such that $P_{out2}$ is similar to $f_2$, but $P_{out1}$ is phase-shifted compared to $f_1$, which provides a smooth operation.

Moreover, in this embodiment, there is no need to make a short strong light pulse every period T, but it is sufficient to generate a square (or rectangular) pulsed waveform each with the same average power.

FIG. 3 shows a block diagram of a configuration of a macro image sensor 20 including multiple pixels 21 each including a CAPD.

The embodiment shown in FIG. 3 provides an implementation of different demodulation signals $f_1$ to $f_9$ to be applied at simultaneously.

For example, for each pixel 21 it is assumed that (roughly) the same recording current (as discussed with reference to FIG. 1) is generated (i.e. the signal shape and intensity of the recording current may be roughly the same).

Hence, for each pixel, a different demodulation signal $f_1$ to $f_9$ may be applied, such that the generation of a coding current (as discussed with reference to FIG. 1) is generated simultaneously, as well, such that a ToF measurement performed with an image sensor according to this embodiment may be performed time-efficiently and signal-to-noise-efficiently.

Figure 4:
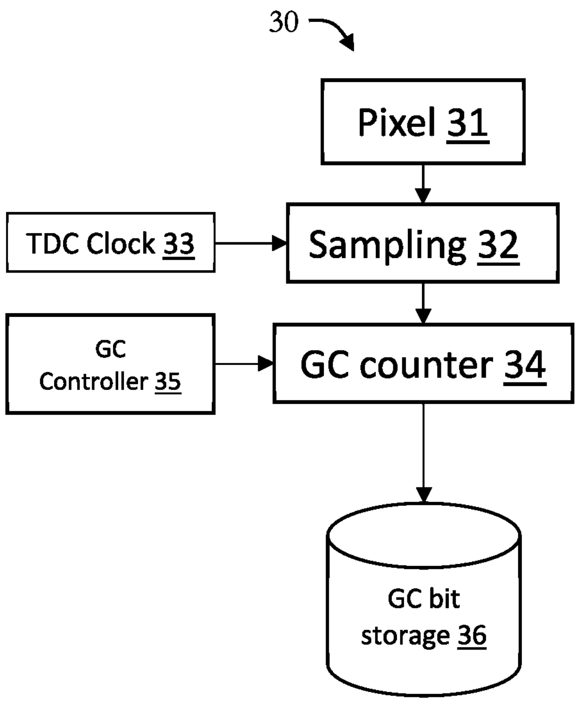
FIG. 4 depicts a block diagram of a readout circuitry for sequential readout of a pixel including a SPAD.

FIG. 4 depicts a block diagram 30 of a readout circuitry for a pixel 31 including a SPAD.

A current signal generated in the pixel 31 is sampled (32), i.e. time-to-digital converted, as it is generally known, wherein the conversion is timed with a time-to-digital converter (TDC) clock 33.

In response to the sampling 32, a signal is transmitted to a Gray Code (GC) counter 34, which is controlled by a GC controller 35 in a way that it corresponds to a sequential application of the timing of the demodulation signals $f_1$ to $f_4$ described with respect to FIG. 1, and it is, thus, detected whether a photo current lies within a detection time, and, if a photo current is detected, a logical one is saved in a GC bit storage 36, and, if no photo current is detected, a logical zero is saved in the GC bit storage 36.

In the embodiment described with reference to FIG. 4, a subsequent measurement may be timed differently (e.g. a first timing may correspond to the timing of the demodulation signal $f_1$ and a second timing may correspond to the timing of the demodulation signal $f_2$ of FIG. 1, and so on), such that in this embodiment, a sequential processing is performed.

Figure 5:
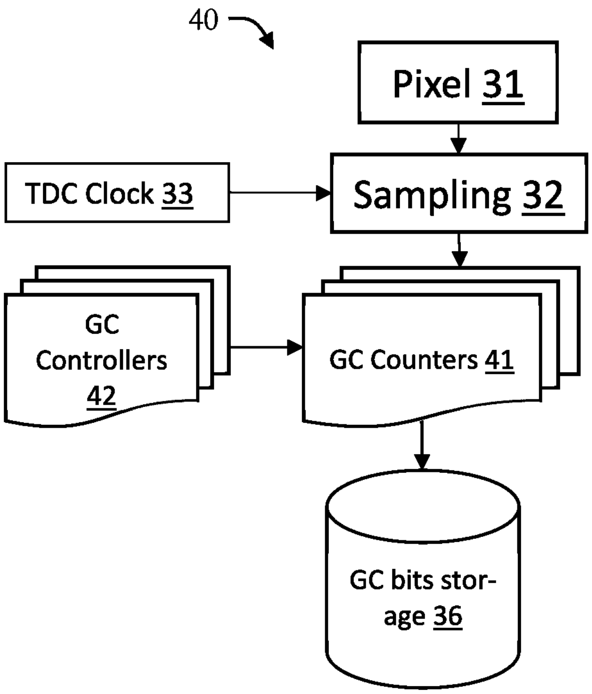
FIG. 5 shows a block diagram of a readout circuitry for parallel readout of a pixel including a SPAD.

On the other hand, in FIG. 5, there is shown a block diagram 40 of an embodiment, in which parallel processing is performed.

The embodiment of FIG. 5 differs of the embodiment of FIG. 4 in that there are multiple (at least two) GC counters being controlled by multiples GC controllers, which are controlled simultaneously, i.e. parallel, such that a ToF measurement can be performed time-efficiently.

Figure 6:
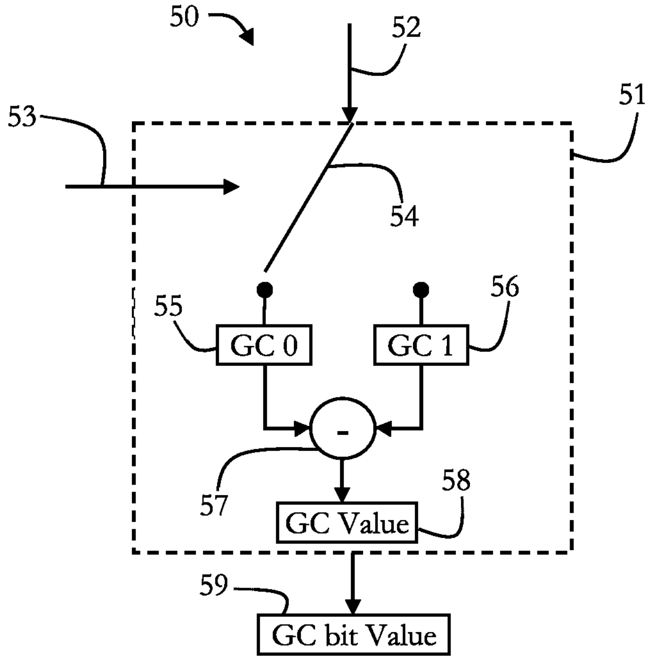
FIG. 6 depicts a block diagram for driving a Gray Code counter.

FIG. 6 depicts a block diagram 50 for driving a Gray Code counter 51. The Gray code counter is fed with a sampling signal 52 from a sampling, as discussed above, and a control signal 53 from a Gray Code controller, as discussed above.

The control signal 53 controls a switch 54 to be set in one of two positions according to a timing as discussed above. In a first position, the switch 54 is coupled to a Gray Code zero counter 55 (GC 0).

In a second position, the switch 55 is coupled to a Gray Code one counter 56 (GC 1).

Resulting signals from the Gray Code zero counter 55 and the Gray Code one counter 56 are compared in a comparator 57, and a resulting GC value is generating in a GC value generation unit 58, which is appended to an existing GC bit code in a GC bit value generation unit 59, in case there is already a GC bit code generated, or is initiated, in case there is no GC bit code generated yet.

Figure 7:
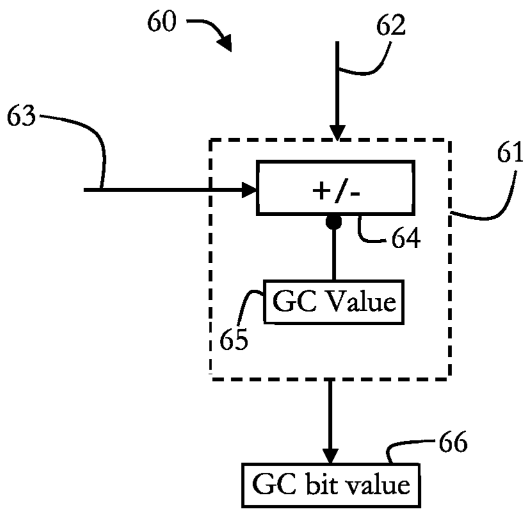
FIG. 7 depicts a block diagram of a further Gray code counter.

FIG. 7 depicts a block diagram 60 of a further embodiment of a GC counter 61 being fed with a sampling signal 62 and a control signal 63, wherein the sampling signal 62 and the control signal 63 are compared by a comparator 64 and the resulting value is fed to a GC value generation unit 65, which, as discussed with respect to FIG. 6, feeds its result to a GC bit value generation unit 66.

Figure 8:
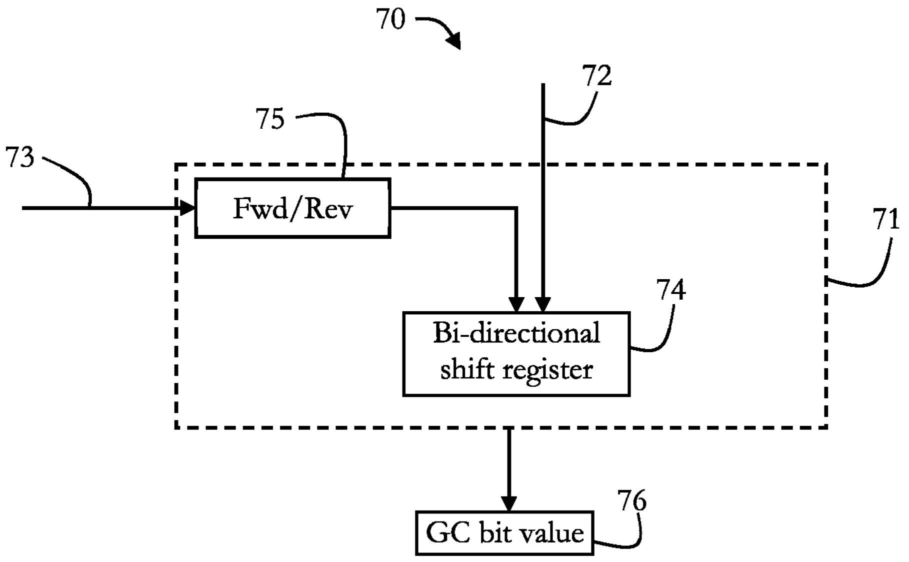
FIG. 8 depicts a block diagram of a further embodiment of a Gray Code counter.

FIG. 8 depicts a block diagram 70 of a further embodiment of a GC counter 71 being fed with a sampling signal 72 and a control signal 73. The sampling signal 72 is fed to a bi-directional shift register 74 and the control signal 73 is fed to a Forward/Reverse unit 75, which in turn feeds its signal to the bi-directional shift register 74 for controlling the direction in which the bits are shifted in the bi-directional shift register, which is configured to compare the two signals and generate a Gray Code value.

The generated GC value is then supplied to a GC bit value generation unit 76.

Figure 9:
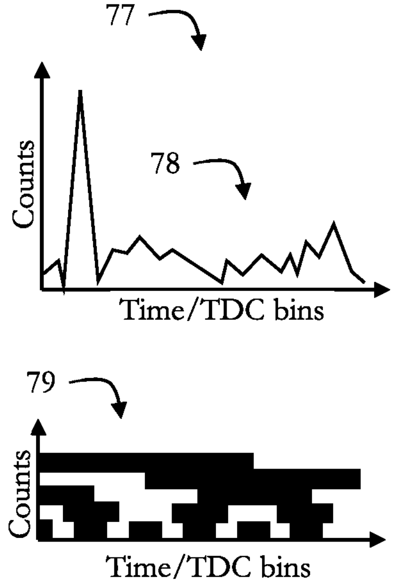
FIG. 9 exemplarily shows a data compression diagram according to the present disclosure.

FIG. 9 shows a data compression diagram 77 according to the present disclosure.

For illustrational purposes only, a histogram 78 is shown, as it is generally known in the field of dToF. It should, however, be noted that it is not necessary to generate a histogram according to the present disclosure. As mentioned in the outset, such a histogram may use a certain amount of memory. The histogram includes, on an abscissa a measured roundtrip delay (i.e. a time) and on an ordinate a number how many times this roundtrip delay is detected (i.e. counts), as it is generally known.

In order to reduce the necessary amount of memory, the histogram is Gray coded according to the present disclosure, which is illustrated in a Gray Code histogram 79, which includes the same axes as the histogram 78, wherein due to the Gray coding discussed in the following, there is no need to generate the histogram 78 and also not the Gray Code histogram 79. The histogram 78 and the Gray Code histogram 79 are only presented for illustration purposes.

From the Gray code histogram, which has five bits in this embodiment, a Gray Code can be read out, which indicates the roundtrip delay and thereby the distance to the scene.

Figure 10:
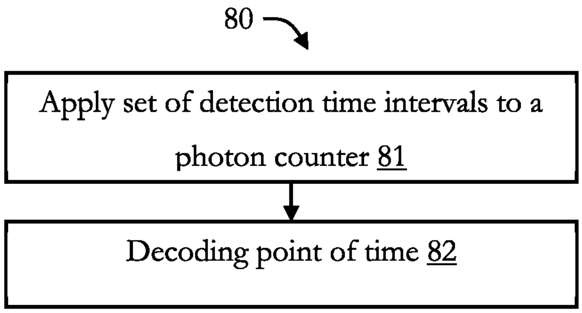
FIG. 10 depicts a block diagram of a method according to the present disclosure.

FIG. 10 depicts a block diagram of a method 80 according to the present disclosure.

In 81, a set of detection intervals is applied to a photon counter, as discussed herein.

In 82, a predetermined point of time indicating a distance to a scene is decoded based on a detection based on the application of the set of detection time intervals, as discussed herein.

Figure 11:
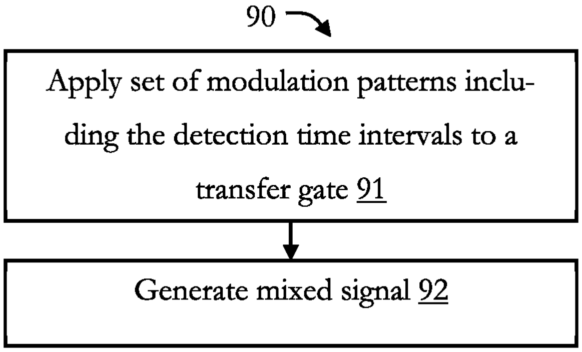
FIG. 11 depicts a block diagram of a further method according to the present disclosure.

FIG. 11 depicts a block diagram of a method 90 according to the present disclosure.

In 91, a set of demodulation patterns including the detection time intervals is applied to a transfer gate, as discussed herein.

In 92, a mixed signal (or multiple mixed signals) is generated by mixing a current generated in response to the detection event with the demodulation patterns, as discussed herein.

Figure 12:
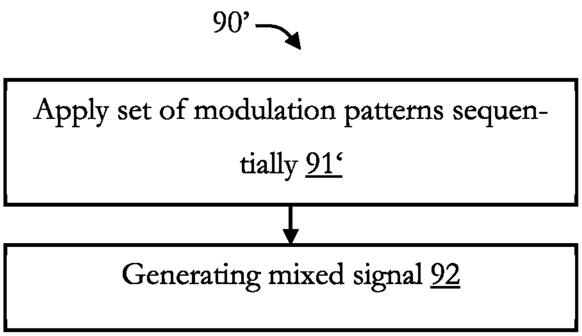
FIG. 12 depicts a block diagram of a first alternative method.

FIG. 12 depicts a block diagram of a method 90' as a first alternative of the method 90, which differs from the method 90 in that 91 is replaced with 91', in which the set of demodulation patterns is applied sequentially, as discussed herein.

Figure 13:
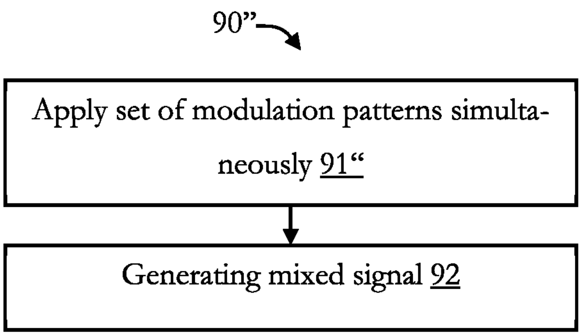
FIG. 13 depicts a block diagram of a second alternative method.

FIG. 13 depicts a block diagram of a method 90" as an alternative of the method 90, which differs from the method 90 in that 91 is replaced with 91', in which the set of demodulation patterns is applied simultaneously, as discussed herein.

Figure 14:
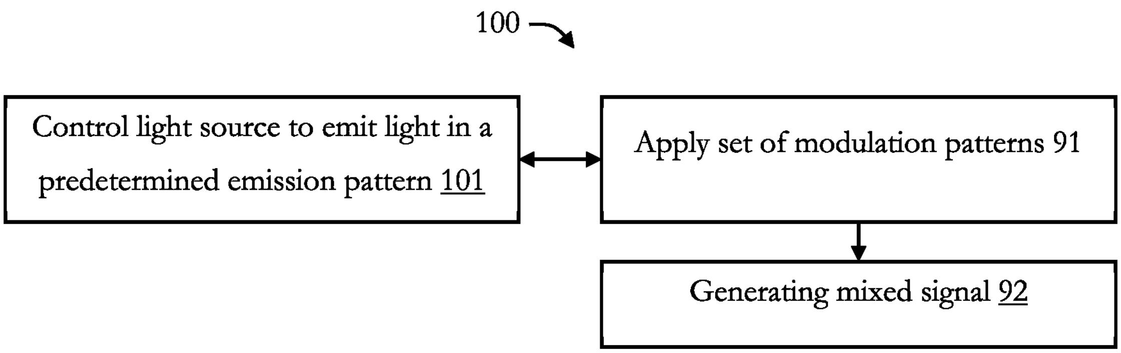
FIG. 14 depicts a block diagram of a further method according to the present disclosure.

FIG. 14 depicts a block diagram of a method 100, which includes the method 90. Additionally, the method 100 includes, in 101, to control a light source to emit light in a predetermined emission pattern, as discussed herein.

Figure 15:
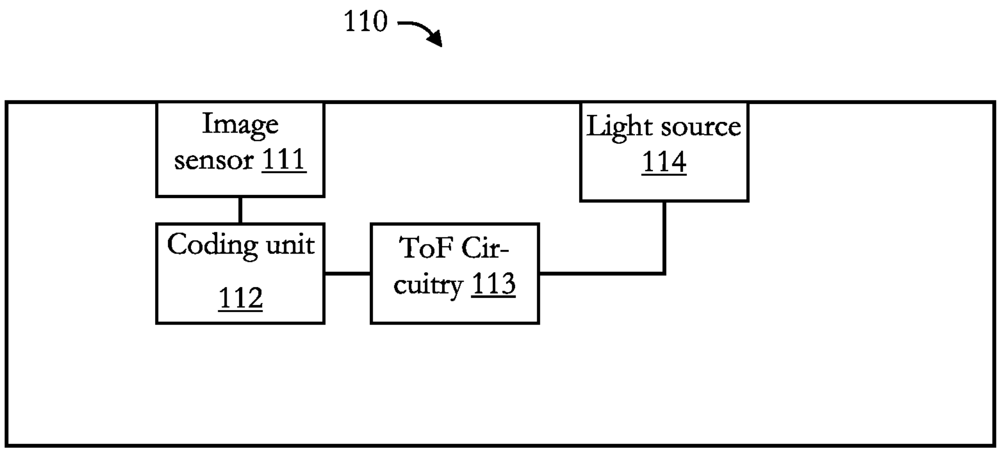
FIG. 15 depicts a block diagram of a ToF camera based on SPADs.

FIG. 15 depicts a block diagram of a ToF camera 110 according to the present disclosure.

The ToF camera 110 includes an image sensor 111, which is based on multiple SPADs, a coding unit 112 configured to sample the image sensor and code the photo detection event, as discussed above with respect to any of the FIGS. 4 to 8. Moreover, the ToF camera 110 includes a ToF circuitry 113 configured to apply the detection time intervals to the coding unit 112, as discussed herein. The ToF camera 110 further includes a light source configured to emit light, which is reflected from a scene and detected by the image sensor 111.

Figure 16:
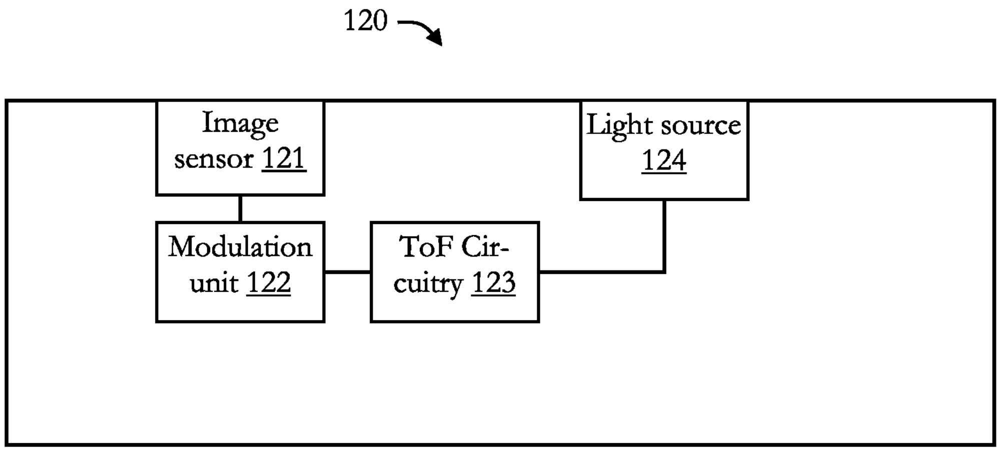
FIG. 16 depicts a block diagram of a ToF camera based on CAPDs.

FIG. 16 depicts a block diagram of a ToF camera 120 according to the present disclosure.

The ToF camera 120 includes an image sensor 121, which is based on multiple CAPDs, a demodulation unit 122 configured to sample a transfer gate (or multiple transfer gates) of the image sensor by applying one or multiple demodulation signals and code the photo detection event, as discussed above with respect to any of the FIGS. 1 to 3. Moreover, the ToF camera 120 includes a ToF circuitry 123 configured to apply the detection time intervals to the demodulation unit 122 and to control the demodulation unit 122 to sample the image sensor 121 as discussed herein. The ToF camera 120 further includes a light source configured to emit light, which is reflected from a scene and detected by the image sensor 121.

The ToF circuitry 123 is further configured to control the light source to emit light in a light emission patterns, as discussed herein.

It should be recognized that the embodiments describe methods with an exemplary ordering of method steps. The specific ordering of method steps is however given for illustrative purposes only and should not be construed as binding. For example the ordering of 101 and 91 in the embodiment of FIG. 13 may be exchanged. Other changes of the ordering of method steps may be apparent to the skilled person.

Please note that the division of the ToF camera 110 or 120 into units 111 to 114 or 121 to 124 is only made for illustration purposes and that the present disclosure is not limited to any specific division of functions in specific units. For instance, the demodulation unit 122 and the ToF circuitry 123 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Time-of-flight circuitry configured to:
apply a set of detection time intervals to at least one light detection event for determining a point of time of the at least one light detection event, wherein the set of detection time intervals has a predetermined detection pattern encoding predetermined points of time.

(2) The time-of-flight circuitry of (1), wherein the predetermined detection pattern is based on a Gray Code.

(3) The time-of-flight circuitry of anyone of (1) and (2) being further configured to apply the set of detection intervals to a photon counter in the predetermined detection pattern, the photon counter being coupled to a single photon avalanche diode.

(4) The time-of-flight circuitry of (3), wherein the photon counter is a Gray Code counter.

(5) The time-of-flight circuitry of anyone of (3) and (4) being further configured to decode the point of time based on Gray Code information generated in the Gray Code counter indicating a distance to a scene.

(6) The time-of-flight circuitry of anyone of (1) to (3) being further configured to apply the set of detection intervals sequentially to the at least one light detection event.

(7) The time-of-flight circuitry of anyone of (1) to (3) being further configured to apply the set of detection intervals simultaneously to the at least one light detection event.

(8) The time-of-flight circuitry of anyone of (1) and (2) being further configured to:
demodulate a current assisted photonic demodulator, with a set of demodulation patterns, thereby applying the set of detection time intervals.

(9) The time-of-flight circuitry of (8) being further configured to mix at least one demodulation signal including the set of demodulation patterns with a light detection signal being indicative of the at least one detection event, thereby generating a mixed signal, and wherein the mixed signal encodes the predetermined points of time.

(10) The time-of-flight circuitry of anyone of (8) and (9) being further configured to apply the set of demodulation patterns sequentially to the at least one light detection event.

(11) The time-of-flight circuitry of anyone of (8) and (9) being further configured to apply the set of demodulation patterns simultaneously to the at least one light detection event.

(12) The time-of-flight circuitry of anyone of (8) to (11) being further configured to control a light source to emit light in a predetermined emission pattern based on the predetermined detection pattern.

(13) A time-of-flight method comprising:
applying a set of detection time intervals to at least one light detection event for determining a point of time of the at least one light detection event, wherein the set of detection time intervals has a predetermined detection pattern encoding predetermined points of time.

(14) The time-of-flight method of (13), wherein the predetermined detection pattern is based on a Gray Code.

(15) The time-of-flight method of anyone of (13) and (14), further comprising applying the set of detection intervals to a photon counter in the predetermined detection pattern, the photon counter being coupled to a single photon avalanche diode.

(16) The time-of-flight method of (15), wherein the photon counter is a Gray Code counter.

(17) The time-of-flight method of anyone of (15) and (16), further comprising decoding the point of time based on Gray Code information generated in the Gray Code counter indicating a distance to a scene.

(18) The time-of-flight method of anyone of (13) to (15) further comprising: applying the set of detection intervals sequentially to the at least one light detection event.

(19) The time-of-flight method of anyone of (13) to (15) further comprising: applying the set of detection intervals simultaneously to the at least one light detection event.

(20) The time-of-flight method of (13), further comprising demodulating a current assisted photonic demodulator, with a set of demodulation patterns, thereby applying the set of detection time intervals.

(21) The time-of-flight method of (20), further comprising mixing at least one demodulation signal including the set of demodulation patterns with a light detection signal being indicative of the at least one detection event, thereby generating a mixed signal, and wherein the mixed signal encodes the predetermined points of time.

(22) The time-of-flight method of anyone of (20) and (21), further comprising applying the set of demodulation patterns sequentially to the at least one light detection event.

(23) The time-of-flight method of (20) and (21), further comprising applying the set of demodulation patterns simultaneously to the at least one light detection event.

(24) The time-of-flight method of anyone of (20) to (23), further comprising controlling a light source to emit light in a predetermined emission pattern based on the predetermined detection pattern.

(25) A computer program comprising program code causing a computer to perform the method according to anyone of (13) to (24), when being carried out on a computer.

(26) A non-transitory computer-readable recording medium that stores therein a computer program product, which, when executed by a processor, causes the method according to anyone of (13) to (24) to be performed.

The invention claimed is:

1. Time-of-flight circuitry configured to:
apply a set of detection time intervals to at least one light detection event for determining a point of time of the at least one light detection event, wherein the set of detection time intervals has a predetermined detection pattern encoding predetermined points of time; and
drive a plurality of photon counters simultaneously to apply the set of detection time intervals to the plurality of photon counters simultaneously, each photon counter being coupled to a single photon avalanche diode,
wherein the circuitry applies the set of detection time intervals to the plurality of photon counters by controlling a switch with a control signal to couple to a first counter in a first position and to a second counter in a second position, and comparing resulting signals from the first counter and the second counter to generate an encoded value.

2. The time-of-flight circuitry of claim 1, wherein the predetermined detection pattern is based on a Gray Code.

3. The time-of-flight circuitry of claim 1 being further configured to apply the set of detection time intervals sequentially to the at least one light detection event.

4. The time-of-flight circuitry of claim 1 being further configured to apply the set of detection time intervals simultaneously to the at least one light detection event.

5. The time-of-flight circuitry of claim 1 being further configured to:

demodulate a current assisted photonic demodulator, with a set of demodulation patterns, thereby applying the set of detection time intervals.

6. The time-of-flight circuitry of claim 5 being further configured to mix at least one demodulation signal including the set of demodulation patterns with a light detection signal being indicative of the at least one detection event, thereby generating a mixed signal, and wherein the mixed signal encodes the predetermined points of time.

7. The time-of-flight circuitry of claim 5 being further configured to apply the set of demodulation patterns sequentially to the at least one light detection event.

8. The time-of-flight circuitry of claim 5 being further configured to apply the set of demodulation patterns simultaneously to the at least one light detection event.

9. The time-of-flight circuitry of claim 5 being further configured to control a light source to emit light in a predetermined emission pattern based on the predetermined detection pattern.

10. A time-of-flight method comprising:

applying a set of detection time intervals to at least one light detection event for determining a point of time of the at least one light detection event, wherein the set of detection time intervals has a predetermined detection pattern encoding predetermined points of time; and driving a plurality of photon counters simultaneously to apply the set of detection time intervals to the plurality of photon counters simultaneously, each photon counter being coupled to a single photon avalanche diode, wherein applying the set of detection time intervals to the plurality of photon counters comprises controlling a switch with a control signal to couple to a first counter in a first position and to a second counter in a second position, and comparing resulting signals from the first counter and the second counter to generate an encoded value.

11. The time-of-flight method of claim 10, wherein the predetermined detection pattern is based on a Gray Code.

12. The time-of-flight method of claim 10, further comprising: applying the set of detection time intervals sequentially to the at least one light detection event.

13. The time-of-flight method of claim 10, further comprising: applying the set of detection time intervals simultaneously to the at least one light detection event.

14. The time-of-flight method of claim 10, further comprising demodulating a current assisted photonic demodulator, with a set of demodulation patterns, thereby applying the set of detection time intervals.

15. The time-of-flight method of claim 14, further comprising mixing at least one demodulation signal including the set of demodulation patterns with a light detection signal being indicative of the at least one detection event, thereby generating a mixed signal, and wherein the mixed signal encodes the predetermined points of time.

16. The time-of-flight method of claim 14, further comprising applying the set of demodulation patterns sequentially to the at least one light detection event.

17. The time-of-flight method of claim 14, further comprising applying the set of demodulation patterns simultaneously to the at least one light detection event.

18. The time-of-flight method of claim 14, further comprising controlling a light source to emit light in a predetermined emission pattern based on the predetermined detection pattern.

* * * * *